United States Patent [19]

de Mets

[11] 3,985,489

[45] Oct. 12, 1976

[54] CONTINUOUSLY OPERATING PRESS FOR MANUFACTURE OF PANELS, SUCH AS CHIPBOARDS, FIBERBOARDS, OR THE LIKE

[75] Inventor: Albert de Mets, Kachtem, Izegem, Belgium

[73] Assignee: Bison-werke Bähre & Greten GmbH & Co. KG, Germany

[22] Filed: Jan. 23, 1975

[21] Appl. No.: 543,429

[30] Foreign Application Priority Data

Jan. 23, 1974 Germany ............................ 2403209

[52] U.S. Cl. ................................ 425/371; 100/153; 425/143; 425/224; 425/335

[51] Int. Cl.$^2$ ........................................ B29C 15/00

[58] Field of Search ............ 425/143, 73, 329, 371; 264/109, 165, 175; 100/153, 143, 151, 154; 72/419; 105/148

[56] References Cited

UNITED STATES PATENTS 3,887,318 6/1975 DeMets .............................. 425/371

*Primary Examiner*—Francis S. Husar
*Assistant Examiner*—Robert J. Charvat
*Attorney, Agent, or Firm*—Craig & Antonelli

[57] ABSTRACT

A continuously operable press utilizing facing endless linked together platen belts for compressing chip materials into chipboards, fiberboards, and the like. A plurality of pressure rollers are provided along the belts for pressing the same towards one another along the portion of their travel paths where they are in facing relationship. With the belts travelling horizontally at the position of their facing runs, these pressure rollers are biased by piston-cylinder apparatus or the like in a vertical direction. For accommodating adjustment of the position of the pressure rollers in the horizontal direction, without necessitating stoppage of the press, needle bearings are provided between supports for the bearings of the pressure rollers and the fixed press frame. Adjusting means in the form of piston-cylinder apparatus are provided for effecting the horizontal adjustment of the bearing supports for the pressure rollers. Fishplates with rollers supported at the press frame are provided for those pressure rollers having piston-cylinder apparatus extending in the vertical direction so as to prevent tilting of same during horizontal adjustment of the pressure rollers.

15 Claims, 1 Drawing Figure

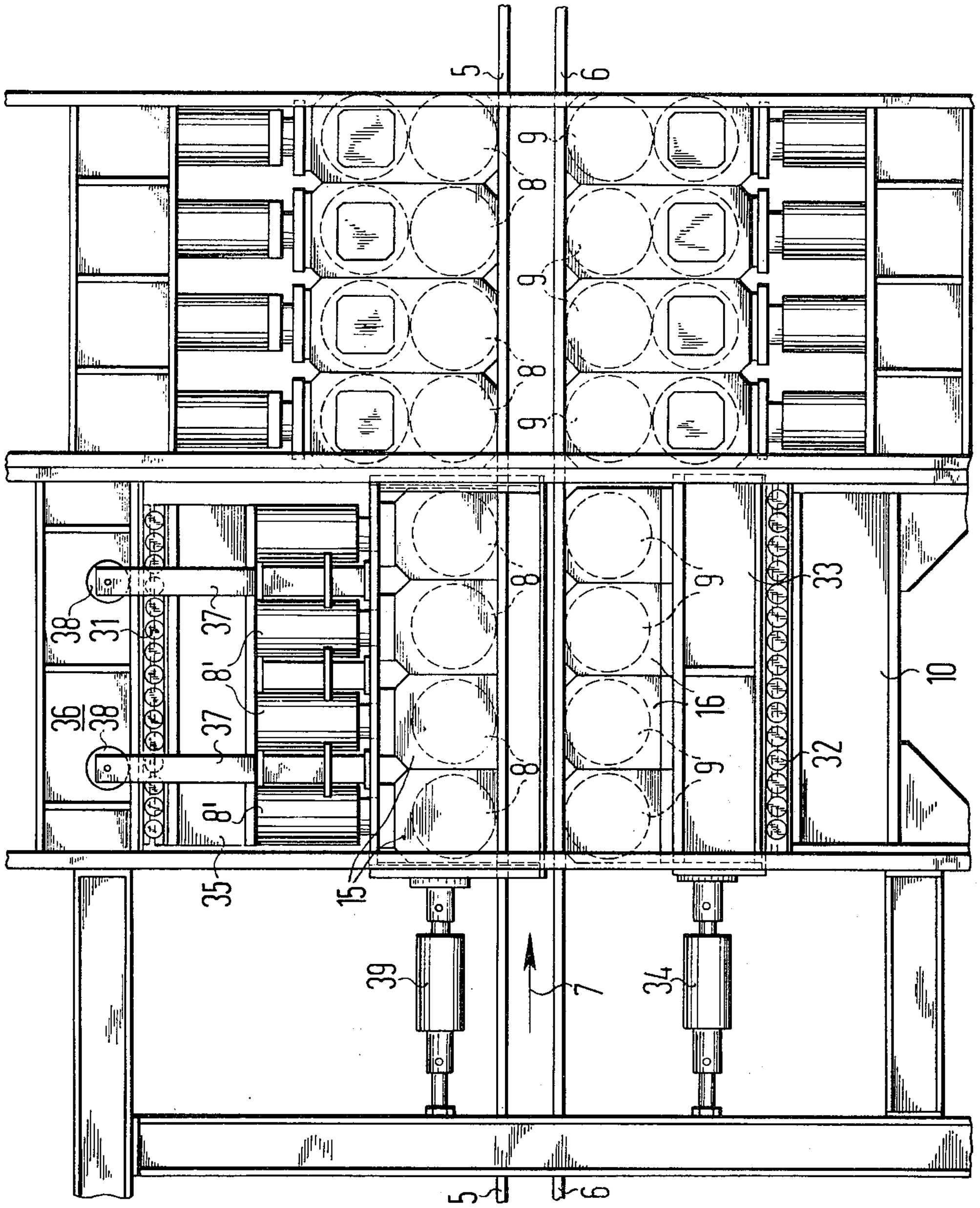
5
6
9
8
8'
9'
7
10
15
16
31
32
33
34
35
36
37
38
39

CONTINUOUSLY OPERATING PRESS FOR MANUFACTURE OF PANELS, SUCH AS CHIPBOARDS, FIBERBOARDS, OR THE LIKE

BACKGROUND AND SUMMARY OF THE INVENTION

This invention relates to continuously operating presses for the manufacture of panels, such as chipboards, fiberboards, or the like, which presses have two superimposed endless belts consisting of mutually linked plates and rotating about axes arranged horizontally and in parallel to each other. The mutually facing runs of these belts are movable preferably by means of drivable pressure rolls in the same direction, and each endless platen belt is encompassed by a further endless belt. Such presses further may include means for adjusting at least one of the ends of several superimposed pressure roll pairs transversely to their axial extension in the horizontal plane, these means being effective on the bearings of the upper and lower pressure rolls. Such a press is conventional (DAS [German Published Application] No. 2,220,553). The adjustment of the bearings of the pressure rolls, however, can only be accomplished if the press is deactivated for a short period of time.

Therefore, the invention is primarily concerned with the problem of making the adjustment possible without having to deactivate the press. This problem is solved, in accordance with this invention, by providing that at least the superimposed bearings of the pressure rolls which are first — as seen in the feeding direction of the press — are supported by needle bearings or the like guided in tracks. If the needle bearings are provided directly above and/or below the bearings of the pressure rolls in accordance with a first preferred arrangement of the invention, this is sufficient in case the pressure forces exerted on the pressure rolls are relatively minor, as is the case in continuously operating rough presses.

However, this just-mentioned construction includes the disadvantage that the upper bearings of the pressure rolls are shifted with respect to the pistons of the hydraulic cylinders controlling the rolls. These cylinders (pistons) tend to urge the pressure rolls against the endless platen belts. Consequently, the pressure forces exerted by the hydraulic cylinders are no longer effective centrally on the bearings and thus no longer centrally on the pressure rolls, which latter feature is important if the pressure forces are relatively high, as is the case, for example, in continuously operating finishing presses.

Therefore, this invention also contemplates arrangements solving the further problem of assuring that the bearings and thus also the pressure rolls, in spite of their movability, are always under a centrally effective force, so that such needle bearings can also be installed in continuously operating finishing presses wherein the required contact pressures are substantially higher than in rough presses of the same type of construction. This further problem has been solved, in accordance with the invention, by disposing the needle bearings or the like, guided in tracks, at least between the first supports of the pressure cylinders arranged in the inlet zone of the press and pertaining to the upper pressure rolls and/or between the first supports of the bearings of the lower pressure rolls. It is especially suitable to combine the needle bearings associated with several pressure rolls into respectively one group, because in such a case the number of needles (pins) or the like can be increased. Thereby, the frictional forces occurring during the shifting of the bearings are reduced to a greater extent, and this has a favorable effect especially in case of relatively long presses of this type, as was demonstrated by experiments. It is, of course, also contemplated to support further pressure rolls, i.e. for example pressure rolls of other groups, in accordance with the invention.

These and further objects, features and advantages of the present invention will become more obvious from the following description when taken in connection with the accompanying drawing, which shows, for purposes of illustration only, a single embodiment in accordance with the present invention.

BRIEF DESCRIPTION OF THE DRAWING

The single FIGURE is a side part-sectional view of a portion of the inlet zone of a press constructed in accordance with the present invention.

DETAILED DESCRIPTION OF THE DRAWING

In a machine frame for a continuously operating press, polygonal guide rolls, not shown, are supported. The subject matter of my copending, commonly assigned U.S. Patent Application Ser. No. 339,039, filed Mar. 8, 1973, now U.S. Pat. No. 3,887,318, issued June 3, 1975, is incorporated herein to the extent necessary for an understanding of the present invention. This copending application discloses a press, of the type contemplated, with polygonal guide rolls and other related press structure. These guide rolls are for an upper endless platen belt 5 and a lower endless platen belt 6, respectively one of these guide rolls being guided and biased so that the corresponding endless platen belt is under a certain pretensioning action. Several drivable upper pressure rolls 8 and several lower pressure rolls 9 serve for setting the two endless platen belts into motion in the direction of arrow 7 with several of the lower pressure rolls 9 also being drivable. Each endless platen belt 5 and 6 is furthermore encompassed (surrounded) by an endless steel belt; however, these endless steel belts are not illustrated. It will be understood, especially with reference to the above-noted copending application that facing runs of the endless steel belts are pushed in pressing relationship against the material being pressed by the platen belts 5 and 6.

Girders 10 are fixedly mounted to the machine frame. By way of needle bearings 32, additional supports 33 are disposed on these girders, the bearings 16 of the lower pressure rolls 9 being attached to these supports 33. The supports 33, with attached bearings 16 and rolls 9, are reciprocable by means of a hydraulic cylinder 34 in parallel to the direction of travel 7 of the endless platen belts 5 and 6 and/or the chipboard slab to be manufactured. The needle bearings 32 are guided in tracks indicated by dashed lines.

The pressure cylinders 8' of the upper pressure rolls 8, the bearings of which are denoted by 15, are mounted to a support 35, and this support 35 is suspended underneath a support 36 by way of needle bearings 31, likewise guided in tracks. This suspension of support 35 underneath support 36 being accomplished by means of fishplates 37 and wheels or the like 38. This unit (35, 8', 15, 8) is adjusted by means of a hydraulic cylinder 39 which adjusts this unit in the same way as the hydraulic cylinder 34 adjusts the lower unit.

The suspension of the entire unit (35, 8', 15 and 8) as described facilitates adjustment of the rolls 8 in the horizontal direction without causing a misalignment of the pressure cylinders 8' with respect to bearings 15 of the pressure rolls 8. In preferred embodiments, means (not illustrated since driving means of known construction can be adapted for use with the present invention) are provided to drive the upper pressure rolls 8 and the lower pressure rolls 9. The pressure rolls associated with the needle bearings are combined respectively into groups, whereby the pressure of several hydraulic cylinders and/or several bearings, to be supported via the needle bearings, is distributed over a relatively large area.

The terms "pressure cylinder" and "hydraulic cylinder" in this specification are intended to depict piston cylinder arrangements wherein the piston and cylinder are movable with respect to one another in response to fluid supplied thereto.

While I have shown and described one embodiment in accordance with the present invention, it is understood that the same is not limited thereto but is susceptible of numerous changes and modifications as known to those skilled in the art and I therefore do not wish to be limited to the details shown and described herein but intend to cover all such changes and modifications as are encompassed by the scope of the appended claims.

I claim:

1. A press for producing boards such as chipboards, fiberboards, and the like; said press comprising:

a first movable endless belt, a second movable endless belt, guiding and moving means engaging said first and second belts for guiding and moving said first and second belts with respective outer surfaces of said belts in facing relationship and moving in the same direction over a material pressing portion of the respective travel paths of said belts such that material forming said boards can be conveyed by and compressed between said belts along said material pressing portion of said respective travel paths, at least one pressure roller engaging the inner surface of said first belt for pressing said first belt toward said second belt during compression of material between said belts, first bearing means rotatably supporting said at least one pressure roller, adjusting means including means engaging said first bearing means for adjusting the position of said first bearing means in a direction parallel to the travel path of said belts, and second bearing means engaging said first bearing means for limiting frictional resistance of said first bearing means to adjustment thereof by said adjusting means.

2. A press according to claim 1, wherein said second bearing means includes needle bearings interposed between a fixed press frame and a support attached to and movable with said first bearing means.

3. A press according to claim 2, wherein a plurality of said pressure rollers are rotatably supported by said first bearing means.

4. A press according to claim 3, wherein a third bearing means is provided which rotatably supports a plurality of pressure rollers engageable with said second belt for pressing said second belt toward said first belt during compression of material between said belts.

5. A press according to claim 4, wherein said adjusting means for adjusting the position of said first bearing means includes piston-cylinder means extending parallel to the travel path of said belts.

6. A press according to claim 5, wherein adjusting means are provided which include means engaging said third bearing means for adjusting the position of said third bearing means in a direction parallel to the travel path of said belts.

7. A press according to claim 6, wherein fourth bearing means including needle bearings are interposed between said fixed frame and a support attached to and movable with said third bearing means for limiting frictional resistance of said third bearing means to adjustment thereof.

8. A press according to claim 2, wherein said first and second belts are each formed of mutually linked platen plates, and wherein each of said first and second belts is surrounded by a further endless belt, which further endless belts are pressed directly against the material being compressed by said platen plates.

9. A press according to claim 7, wherein said first and second belts are each formed of mutually linked platen plates, and wherein each of said first and second belts is surrounded by a further endless belt, which further endless belts are pressed directly against the material being compressed by said platen plates.

10. A press according to claim 8, wherein a plurality of pressure rollers are provided, spaced along the material pressing portion of the travel path of said first and second belts, for pressing said first belt toward said second belt, and wherein said adjusting means and second bearing means are provided for accommodating adjustment of at least the first few pressure rollers as viewed in the travel direction of said first and second belts.

11. A press according to claim 8, wherein a plurality of pressure rollers are provided for each of said first and second belts, spaced along the material pressing portion of the travel path of said first and second belts, for pressing said first belt toward said second belt, and wherein said adjusting means and second and fourth bearing means are provided for accommodating adjustment of at least the first few pressure rollers as viewed in the travel direction of said first and second belts.

12. A press according to claim 10, wherein the needle bearings associated with several pressure rollers are combined into a single group for supporting a single support which carries the roller supporting bearings for said several pressure rolls.

13. A press according to claim 11, wherein the needle bearings associated with several pressure rollers are combined into a single group for supporting a single support which carries the roller supporting bearings for said several pressure rolls.

14. A press according to claim 2, wherein a piston-cylinder apparatus controllably applies pressure on said first bearing means in a direction toward said second belt, and wherein fishplate means rollably carry said first bearing means on the fixed press frame, whereby adjustment of said at least one pressure roller in the travel direction of said belts is accommodated without tilting the axis of said piston-cylinder apparatus.

15. A press according to claim 10, wherein said first and second belts travel in horizontal planes along said material pressing portion of their travel paths, wherein the rotation axes of said pressure rollers extend transversely to said travel path in horizontal planes, and wherein said adjusting means includes means for moving said pressure rollers horizontally.

* * * * *